Figure 1:
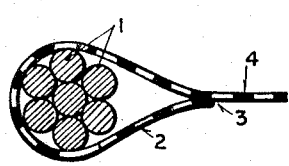

Jan. 3, 1967   H. GREBER   3,296,357
DEVICE TO PREVENT VIBRATION OF AERIAL CONDUCTORS
Filed Oct. 22, 1963

INVENTOR
Henry Greber

United States Patent Office 3,296,357
Patented Jan. 3, 1967

3,296,357
DEVICE TO PREVENT VIBRATION OF
AERIAL CONDUCTORS
Henry Greber, 225 W. 80th St., Apt. 8-D,
New York, N.Y. 10024
Filed Oct. 22, 1963, Ser. No. 317,975
1 Claim. (Cl. 174—42)

This invention relates to vibration of wires, cables and the like, in particularly as used on electrical transmission and distribution lines. With increased use of aluminum, which is of smaller resistance to vibration than is copper, for transmission and distribution lines, the need for elimination of vibrations of conductors is now of growing importance. Vibration dampers known and used as present are all built on the principle of suppression of already existing vibration by dissipation of its energy. This approach is almost exclusively used in the prior art. According to it a large number of types of vibration dampers have been invented, and many of them are commercially available. They all suffer from a common disadvantage: that of limited effectiveness. None of them claims, or can claim of having solved the vibration problem of electrical overhead lines. They are all expensive, and their installation is costly, particularly if one considers that a large number of them has to be used on a line.

Both kinds of conductor vibration, the aeolian as well as galloping are wind induced. Both kinds cause damage primarily to the conductors, but also to the supporting structures, by creating fatigue of the respective materials. Vibrations can create resonance of elements of the supporting structures, shake loose bolts, nuts, rivets, and other fastenings. Swings of galloping conductors may be so large as to cause contacts of adjacent phase conductors, with resulting short circuits and tripping out of the line. Galloping of conductors so powerful as to cause actually their rupture have been recorded. Glaze is usually, but not always, present on galloping conductors. This kind of vibration may form one or two loops in each span, with adjacent spans being in phase, or in phase opposition, and may develop a characteristic twisting and un-twisting of the conductors. Such motion appears coordinated with the motion of the conductors in a substantially vertical plane. While galloping is the most dangerous form of vibration, also aeolian vibration is a serious menace to the continuity of electric service.

The cause of conductor vibration is known today with considerable certainty. It consists in the so called Kármán vortices. According to Theodore von Kármán, on a conductor exposed to the wind, air vortices are formed on its upper and lower leads. These vortices are detached alternately from the top and bottom of the conductor's lee side. The rate of these detachments, each causing a vertical force, determines the frequency of the vibration. This frequency depends on the wind velocity and the parameters of the conductors.

In details, the process of vortex formation runs as follows: A wind blowing past a conductor does not have exactly the same velocity on top and on the bottom of the conductor. A slight difference between the wind velocities on the upper and lower side of the conductor is caused by a slight difference in air friction on these sides. The slightly higher velocity creates a minute underpressure in back of the conductor. This causes a flow of air to fill the rarified space. The latter flow causes the eddy called vortex. The eddy not only restores the balance of pressures, but creates a very small over-pressure on the side at which an under-pressure was existing before. This reverses the eddy. After that the cycle of events repeats itself as long as the wind blows. The alternate eddies create alternate forced, perpendicular to the direction of the wind. These are the so called Kármán forces, causing vibration of both, of the aeolian and of the galloping variety.

It is clear from the preceding, that to avoid conductor vibration is to avoid the formation of Kármán forces. Consequently, the basic approach of this invention is, not to suppress or attenuate vibration that came already into being, but to prevent the formation of Kármán vortices altogether. In other words: the primary purpose of this invention is to provide a vibrationless conductor, by means of preventing the formation of Kármán vortices on it. Another objective of this invention is also to suppress corona losses, since this is achievable with the same means that are used for the primary purpose. In addition, the same means can also be used to prevent corrosion of aerial conductors.

The primary as well as the additional objectives of this invention are achieved by the simple, but effective method of covering the aerial conductor with pliable sheets, which when exposed to the wind, adjust themselves into its direction. These sheets form a streamlined body around the conductor.

The nature of this invention and its advantages will be clearly understood from the following description in conjunction with the accompanying drawing and claim.

Figure 2:
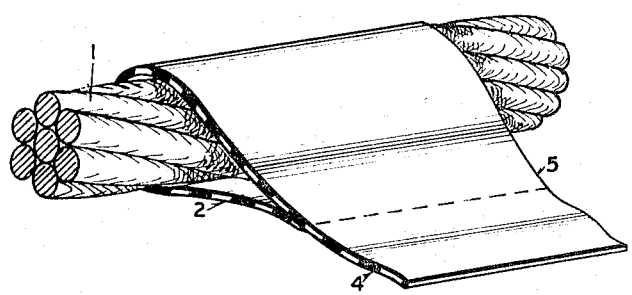
Figure 3:
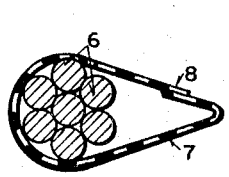
Figure 4:
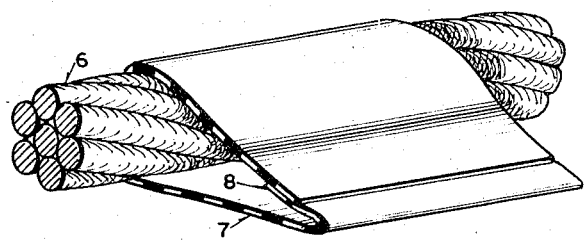
Figure 5:
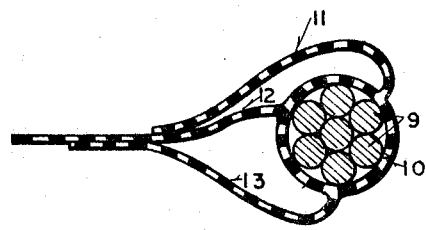
Figure 6:
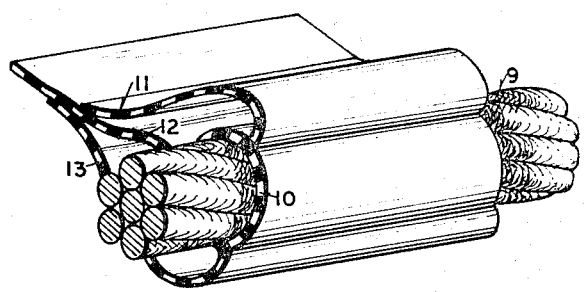

In the attached drawing FIG. 1 is a cross sectional view of a stranded conductor provided with a loosely fitting, plastic cover with a flag-like edge. FIG. 2 shows a perspective side view of the conductor and cover, which are shown in cross section in FIG. 1. A cross sectional view of another embodiment of this invention is presented in FIG. 3 in which a conductor with a loosely fitting hose can be seen. FIG. 4 demonstrates a perspective side view of the embodiment whose cross sectional view is shown in FIG. 3. In FIG. 5 is drawn a cross sectional view of a stranded conductor covered with an insulating sheath to which three flag-like tapes are attached. This embodiment of the invention is shown in perspective view in FIG. 6.

In more detailed consideration of FIG. 1 it can be seen that stranded conductor 1, carries a loosely fitting hose 2, made of plastic tape, glued or otherwise joined in point 3. One edge of the tape extends over point 3, and forms a flag 4, running along the protected conductor. In the perspective side view shown in FIG. 2, conductor 1, hose 2, and flag 4, can be seen in their special configuration. The line along which the tape is joined is designated with the numeral 5. It is obvious that the tape can be joined along line 5, not only by glueing, but also by means of a seam, or by means of staples, or clamps. The tape can be flexible, or semi-rigid to keep the drop shape.

In the embodiment whose cross sectional view is shown in FIG. 3, the stranded conductor 6, is covered with a loosely fitting hose 7, which has no protruding flag, but its tail end has a flag-like shape. Also this hose is made of a tape joined by glueing, or by other means, in point 8. This point appears also in the perspective side view shown in FIG. 4. The same parts shown in FIG. 3 and FIG. 4 are designated with the same numerals respectively.

Still another embodiment of this invention can be seen in the cross sectional view in FIG. 5, in which the stranded conductor 9, is covered with an insulating layer 10, to which three flag-like tapes 11, 12, 13, are attached. The same conductor, its sheath 10, and the flags can be seen in the perspective side view shown in FIG. 6. Three flags are shown only for example, their number can be smaller or larger than three. If one tape is used, it does not matter at which point it is attached to the sheath. If two tapes are used, it is better to attach them to the sheath at points not laying on a diametrical line.

The tape used in all these embodiments can be of weather resistant plastics, possibly reinforced with fiber glass or threads of vegetable (cotton), or animal (wool) origin. Glass fiber braid can be applied for durability. It can be semi-rigid, and be provided with weeping holes. It is obvious that the tape can be fastened to the conductor by sticking it between the strands of the latter. The so fastened tape, though winding itself spirally around the conductor, will adjust itself in the direction of the wind.

All the described embodiments of this invention operate on the principle that an obvious means to prevent conductor vibration is to streamline them. Obviously as it sounds, it may not be easy to actualize directly. It is possible to manufacture a conductor of streamlined cross section, say of a profile of an elongated ellipse. Such profile could be approximated by joining a large-diameter conductor with two small-diameter conductors, one on each side of the former. Also five or seven conductors of staggered diameters could be used, and spacers between these conductors could be applied. Such streamlined conductor would prevent the formation of vortices as long as its longer axis would remain horizontal. This, however, is hardly possible to enforce, or in other words, a twisting of such conductor appears unavoidable. Not to speak of the difficulties in its manufacture and installation.

For the above reasons the indirect approach is choosen in this invention. Instead of streamlining the conductor itself, it is provided with a cover, which fits loosely around the conductor, can adjust itself easily in the momentary direction of the wind, and taking on this direction, streamlines the conductor. Any possible Kármán forces will act on the tail end of the flexible conductor cover, and will not affect the conductor itself to cause its vibrations. Therefore all embodiments of this invention contain soft, pliable sheets which adjust themselves in direction of the wind, and together with the conductor form a body of drop-shaped cross section. But, these sheets have also another, important function. They prevent the transverse motion of the air along the rear surface of the conductor. Thus the formation of any vortices is positively prevented. This effect can be achieved by flexible as well as by semi-flexible sheets.

The continuous, loosely fitting hose, as well as the insulating layer deposited directly on the surface of the conductor serve also for miminization of the corona discharge current, and of the corona losses and radio and television interference connected with it. The insulating layer, if reinforced say by means of fiber glass, or other suitable fibers, can add to the overall tensile strength of the conductor.

To some extent, the pliable sheets covering the conductor prevent the formation of sleet on it. These sheets being in continuous motion break up the slightest ice flakes formed on them. This continuous motion prevents these sheets to be encased in ice. For conductors protected with flexible sheets according to this invention, no electric sleet-melting, as an anti-galloping measure, appears to be necessary. Since the applied protective flag-like tapes are flexible and pliable, their action as vibration generators is completely excluded.

Not all sections of the line are equally exposed to conductor vibration. Such is likely to appear in long spans, or in spans of high tension, or exposed to winds. The above described anti-vibration measures can be limited to such sections of the line only. These means can be applied on the conductor right in the manufacturing plant, or they can be put additionally on the conductors as they are rolled of the reels. It is important to notice that no changes in the structure, or methods of manufacturing of the conductors are necessary for application of the vibration preventing measures according to this invention.

Though those vibration preventing measures were described and illustrated as applicable to overhead conductors of electrical lines, it is clear that they can be equally well applied for prevention of vibration of stacks, antenna masts, and bridges.

Therefore, the embodiments described in this specification and shown in the drawing are to be considered as illustrative only, serving for exposure of the inventive idea, but not restrictive. Within the scope of this idea many modifications, variations, changes by addition, subtraction, or replacement of elements by equivalents can be made, all in the spirit of this invention and within the limits set by the following claim.

I claim:

An overhead conductor protected against wind-induced vibration by means of a tightly fitting around it insulating layer to which a plurality of flag-like tapes is attached, which are flexible and can adjust themselves in the direction of the momentary wind, said insulating layer together with said conductor and said flag-like tapes forming a streamlined body of substantially drop-shaped cross section, with said flag-like tapes preventing any transverse motion of the air on the lee side of said conductor.

References Cited by the Examiner

FOREIGN PATENTS 877,588   9/1942   France.

LEWIS H. MYERS, *Primary Examiner.*

J. RUGGERIO, *Assistant Examiner.*